(12) United States Patent
Hui et al.

(10) Patent No.: US 12,389,904 B2
(45) Date of Patent: Aug. 19, 2025

(54) METHOD FOR PREPARING NATURAL ANTIBACTERIAL AGENT BY IMMOBILIZING PLANT ESSENTIAL OIL IN ATTAPULGITE PORE CHANNELS

(71) Applicant: Lanzhou Institute of Chemical Physics, Chinese Academy of Sciences, Gansu (CN)

(72) Inventors: Aiping Hui, Gansu (CN); Aiqin Wang, Gansu (CN); Yuru Kang, Gansu (CN); Fangfang Yang, Gansu (CN); Bin Mu, Gansu (CN)

(73) Assignee: LANZHOU INSTITUTE OF CHEMICAL PHYSICS, CHINESE ACADEMY OF SCIENCES, Gansu (CN)

( * ) Notice: Subject to any disclaimer, the term of this patent is extended or adjusted under 35 U.S.C. 154(b) by 486 days.

(21) Appl. No.: 17/780,823

(22) PCT Filed: Feb. 9, 2021

(86) PCT No.: PCT/CN2021/076364
§ 371 (c)(1),
(2) Date: Oct. 5, 2022

(87) PCT Pub. No.: WO2021/160135
PCT Pub. Date: Aug. 19, 2021

(65) Prior Publication Data
US 2023/0217920 A1 Jul. 13, 2023

(30) Foreign Application Priority Data
Feb. 10, 2020 (CN) .......................... 202010084670.1

(51) Int. Cl.
| | | |
|---|---|---|
| *A01N 25/26* | (2006.01) |
| *A01N 25/08* | (2006.01) |
| *A01N 25/12* | (2006.01) |
| *A01N 31/08* | (2006.01) |
| *A01N 33/12* | (2006.01) |
| *A01N 37/12* | (2006.01) |
| *A01N 43/16* | (2006.01) |
| *A01N 65/00* | (2009.01) |
| *A01N 65/22* | (2009.01) |
| *A01N 65/24* | (2009.01) |
| *A01N 65/28* | (2009.01) |

(52) U.S. Cl.
CPC ............ *A01N 25/26* (2013.01); *A01N 25/08* (2013.01); *A01N 25/12* (2013.01); *A01N 31/08* (2013.01); *A01N 33/12* (2013.01); *A01N 37/12* (2013.01); *A01N 43/16* (2013.01); *A01N 65/00* (2013.01); *A01N 65/22* (2013.01); *A01N 65/24* (2013.01); *A01N 65/28* (2013.01)

(58) Field of Classification Search
None
See application file for complete search history.

(56) References Cited

U.S. PATENT DOCUMENTS

2005/0158403 A1* 7/2005 Lee .................. A01N 65/00
424/725

OTHER PUBLICATIONS

Machine translation of CN 111195285 (May 26, 2020).*
Machine translation of CN 111034861 (Apr. 21, 2020).*

* cited by examiner

*Primary Examiner* — John Pak
(74) *Attorney, Agent, or Firm* — Kirk A. Wilson; Joseph T. Guy; Patent Filing Specialist Inc.

(57) ABSTRACT

A method for preparing a natural antibacterial agent by utilizing attapulgite pore channels to immobilize plant essential oil. Natural antibacterial agent plant essential oil is sprayed on the surface of attapulgite powder while stirring, after mechanically grinding the materials, a liquid glycerol monolaurate and quaternary ammonium salt aqueous solution are sequentially sprayed, after uniformly stirring and mixing the materials, a mixture is extruded by using an extruder, and drying, crushing and packaging are performed.

8 Claims, 1 Drawing Sheet

METHOD FOR PREPARING NATURAL ANTIBACTERIAL AGENT BY IMMOBILIZING PLANT ESSENTIAL OIL IN ATTAPULGITE PORE CHANNELS

CROSS REFERENCE TO RELATED APPLICATION

This patent application claims the benefit and priority of Chinese Patent Application No. 202010084670.1, entitled "Method for preparing natural antibacterial agent by immobilizing plant essential oil in attapulgite pore channels" filed on Feb. 10, 2020, the disclosure of which is incorporated by reference herein in its entirety as part of the present application.

TECHNICAL FIELD

The present disclosure relates to a method for preparing a natural antibacterial agent, and in particular to a method for preparing a natural antibacterial agent by immobilizing a plant essential oil in attapulgite, belonging to the field of mineral functional materials.

BACKGROUND ART

Natural plant essential oils have certain antibacterial activities against bacteria, fungi and viruses due to their broad antibacterial spectrum, and have been widely used in food, cosmetics, medical and health care drugs, clinical medicine, animal breeding and daily chemical products. Antibiotics-replacing products based on natural plant extracts have currently become a main direction in marketing and R&D, and also one of the most common functional additive products used in antibiotics-replacing feed in the EU. The natural plant essential oils are highly concerned because they do not produce bacterial drug resistance, and have been used in animal feed by related companies. However, due to reasons such as high volatility, environmental sensitivity of molecular structure and poor heat resistance, the use of plant essential oils is limited to some extent.

Attapulgite is a natural one-dimensional and nano-scale hydrous clay mineral rich in magnesium aluminum silicate. The basic structural unit of attapulgite crystal is composed of double chains containing silicon-oxygen tetrahedrons parallel to the c-axis. The free oxygen atoms of the silicon-oxygen tetrahedrons in the chain are alternately arranged up and down in the orientation of groups of four, and each chain-layered unit is linked together through Si—O—Si bond to form zeolite-like pore channels with a cross-sectional dimension of 0.37 nm×0.64 nm (Scientia Sinica Chimica, 2018, 48, 1432-1451). The unique structure of attapulgite which integrates both nano-rod crystals and nano-pore channels makes it possible to not only construct nanocomposites through the rod crystals and the surface groups, but also build hybrid functional materials through the nano-pore channels (Dyes Pigments, 2018, 149, 521-530). Under mechanochemical action, organic molecules may be retained in the pore channels of attapulgite.

Attapulgite has been used in animal feed additives. Studies have shown that the addition of attapulgite to the feed may help adsorb toxic and harmful substances such as enteric pathogens, heavy metals and mycotoxins, prolong residence time of chyme in digestive tract and improve nutrient utilization of feed, thereby protecting animal guts and improving animal production performance (Non-metallic Mines, 2015, 38: 9-12). However, the means of solving the technical problem of easy volatilization and easy oxidization of plant essential oils used in feed, involving combining attapulgite with plant essential oils, forming a first encapsulation on the surface of attapulgite through the heating-melting and cooling-solidification of glyceryl monolaurate, and realizing a second encapsulation through quaternary ammonium salts, are rarely reported.

SUMMARY

An objective of the present disclosure is to provide a method for preparing a natural antibacterial agent by immobilizing a plant essential oil into attapulgite to solve the problems of volatility, environmental sensitivity and poor thermal stability of natural plant essential oils.

In the present disclosure, the method for preparing a natural antibacterial agent by immobilizing a plant essential oil in attapulgite pore channels includes: spraying a natural plant essential oil on a surface of attapulgite powders under stirring, mechanically grinding, then spraying liquid glyceryl monolaurate and a quaternary ammonium salt aqueous solution in turn, followed by fully stirring, and extruding with an extruder, drying, crushing and packaging.

The attapulgite may be a product with purity equal to or greater than 90% obtained by acidification with sulfuric acid accounting for a mass percentage of 2-3% of the attapulgite to remove sands.

The natural plant essential oil may be one or a mixture of at least two selected from the group consisting of oregano essential oil, carvacrol, cinnamaldehyde, citral, tea tree oil, eucalyptus oil and wormwood oil; an amount of the natural plant essential oil may account for a mass percentage of 15-50% of the attapulgite.

The mechanical grinding may be conducted by grinding in a ball mill for 30 min with a ball-to-material ratio of 1:10.

An amount of glyceryl monolaurate may account for a mass percentage of 5-10% of the attapulgite.

The quaternary ammonium salt aqueous solution may be any one selected from the group consisting of a cetyltrimethylammonium bromide-chitooligosaccharide aqueous solution, a carboxymethyl hydroxypropyltrimethylammonium chloride-chitooligosacchari de aqueous solution, an N-hydroxypropyltrimethylammonium chloride-chitooligosacchari de aqueous solution, a cetyltrimethylammonium bromide aqueous solution and a benzyldodecyldimethylammonium bromide aqueous solution, and an amount of the quaternary ammonium salt may account for a mass percentage of 1-5% of the attapulgite.

The extrusion may be performed by extruding a mixture into long strips in semi-dry state with the extruder, and a diameter of the long strip may be in a range of 0.2-0.6 mm.

According to the present disclosure, by means of the adsorption function of attapulgite, the technical problems of easy volatilization and oxidization of plant essential oils when used in feed are solved by retaining the natural plant essential oil in the pore channels of attapulgite under mechanochemical action, forming a first encapsulation on the surface of attapulgite through the heating-melting and cooling-solidification of glyceryl monolaurate, and realizing a second encapsulation through the quaternary ammonium salts.

Antibacterial properties are evaluated by the minimum inhibitory concentration (MIC) assay. An experimental group, a negative control group, a positive control group and a blank control group are set up.

(1) Preparation of standard strains: standard strains of *Escherichia coli* (*E. coli*, ATCC 25922) and *Staphylococcus* aureus (*S. aureus*, ATCC 25923) are selected. *E. coli* and *S. aureus* stored at −20° C. are thawed and inoculated into Luria-Bertani (LB) broth, and incubated in an incubator at 35° C. for 12 h at a speed of 160 r/min. After resurrecting the strains, the strains are transferred to nutrient agar media in turn, and incubated in a constant temperature incubator at 37° C. After 3 h, the bacteria are subcultured to a logarithmic phase. Single colonies of the standard strains on logarithmic phase are selected to prepare bacterial suspensions. The bacterial suspensions are adjusted to have a 0.5 McFarland standard turbidity, and then are diluted with PBS in a ratio of 1:10 to make them have bacterial counts of $10^7$ CFU/mL, $10^6$ CFU/mL, $10^5$ CFU/mL and $10^4$ CFU/mL, respectively.

(2) Preparation of agar plates with different concentrations of samples to be measured: 2.5 mg/mL, 1.5 mg/mL, 1 mg/mL and 0.5 mg/mL for *E. coli* group, and 1.5 mg/mL, 1 mg/mL, 0.5 mg/mL and 0.1 mg/mL for *S. aureus* group.

(3) Spot-seeding: 1 µL of the above bacterial suspension (with a bacterial count of about $1\times10^4$ CFU/mL) is pipetted and spot-seeded on agar plates containing samples to be measured. In each plate, the bacterial suspension is spot-seeded at three different positions, and the test is repeated twice. All the plates are transferred to a constant temperature incubator for culture, and the growth of the bacteria is observed after culturing at 37° C. for 24 h.

FIG. 1 is a digital photograph of an extruded product according to the present disclosure. The product is well-formed and is in the form of granules after simple crushing, which may be directly used in processing for feed formulation.

FIG. 2 shows the results of the MIC assay of samples prepared according to the present disclosure. The results show that the MICs of the samples against *E. coli* and *S. aureus* are 1 mg/mL and 0.5 mg/mL, respectively, exhibiting a strong antibacterial activity against Gram-negative and Gram-positive bacteria.

DETAILED DESCRIPTION OF THE EMBODIMENTS

Figure 1:
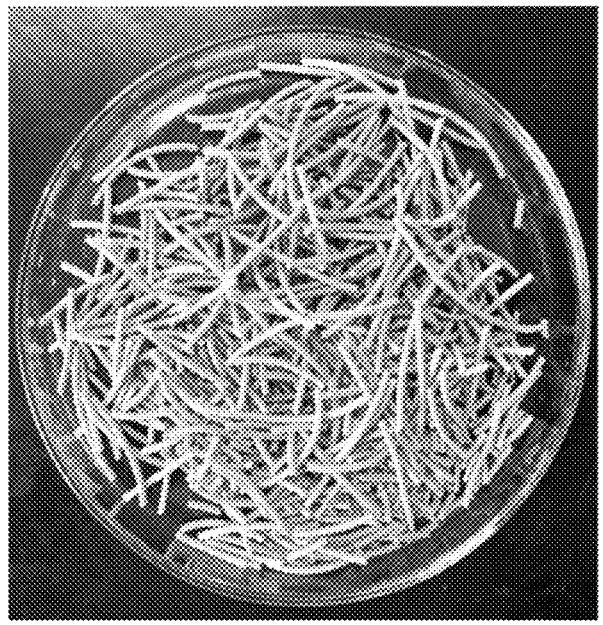
FIG. 1 is a digital photograph of an extruded product according to the present disclosure.
Figure 2:
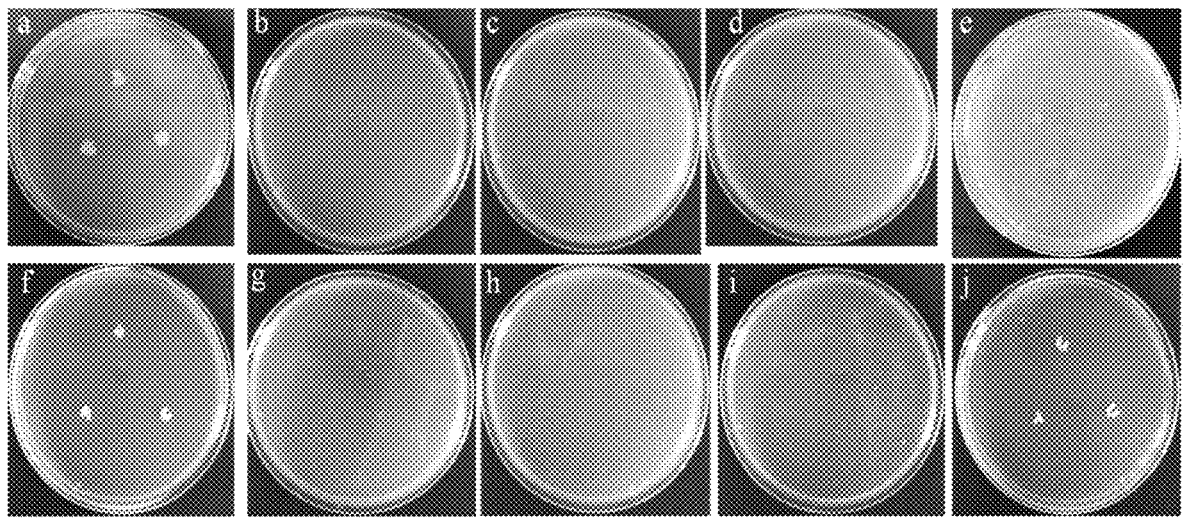
FIG. 2 shows the results of the MIC assay of samples prepared according to the present disclosure against *E. coli* and *S. aureus*.

The method for preparing a natural antibacterial agent by immobilizing a plant essential oil in attapulgite and antibacterial property according to the present disclosure will be described in detail below with reference to embodiments.

EXAMPLE 1

Under stirring, a mixture of oregano essential oil accounting for a mass percentage of 5% of the attapulgite and carvacrol accounting for a mass percentage of 10% of the attapulgite was sprayed onto the surface of attapulgite powders, and then placed in a ball mill for grinding for 30 min with a ball-to-material ratio of 1:10. The resulting mixture was placed in a stirring tank, sprayed with heating-melted glyceryl monolaurate accounting for a mass percentage of 5% of the attapulgite, and then sprayed with a cetyltrimethylammonium bromide-chitooligosaccharide aqueous solution accounting for a mass percentage of 1% of the attapulgite. After spraying, the resultant was continuously stirred for 30 min, and then put into an extruder for extrusion. The extrudate was dried, crushed and packaged to obtain a product.

EXAMPLE 2

Under stirring, carvacrol accounting for a mass percentage of 50% of the attapulgite was sprayed onto the surface of attapulgite powders, and then placed in a ball mill for grinding for 30 min with a ball-to-material ratio of 1:10. The resulting mixture was placed in a stirring tank, sprayed with heating-melted glyceryl monolaurate accounting for a mass percentage of 10% of the attapulgite, and then sprayed with a cetyltrimethylammonium bromide-chitooligosaccharide aqueous solution accounting for a mass percentage of 5% of the attapulgite. After spraying, the resultant was continuously stirred for 30 min, and then put into an extruder for extrusion. The extrudate was dried, crushed and packaged to obtain a product.

EXAMPLE 3

Under stirring, a mixture of oregano essential oil accounting for a mass percentage of 5% of the attapulgite, carvacrol accounting for a mass percentage of 5% of the attapulgite, cinnamaldehyde accounting for a mass percentage of 5% of the attapulgite and citral accounting for a mass percentage of 5% of the attapulgite was sprayed onto the surface of attapulgite powders, and then placed in a ball mill for grinding for 30 min with a ball-to-material ratio of 1:10. The resulting mixture was placed in a stirring tank, sprayed with heating-melted glyceryl monolaurate accounting for a mass percentage of 7.5% of the attapulgite, and then sprayed with a carboxymethyl hydroxypropyltrimethylammonium chloride-chitooligosacchari de aqueous solution accounting for a mass percentage of 2.5% of the attapulgite. After spraying, the resultant was continuously stirred for 30 min, and then put into an extruder for extrusion. The extrudate was dried, crushed and packaged to obtain a product.

EXAMPLE 4

Under stirring, cinnamaldehyde accounting for a mass percentage of 30% of the attapulgite was sprayed onto the surface of attapulgite powders, and then placed in a ball mill for grinding for 30 min with a ball-to-material ratio of 1:10. The resulting mixture was placed in a stirring tank, sprayed with heating-melted glyceryl monolaurate accounting for a mass percentage of 5% of the attapulgite, and then sprayed with an N-hydroxypropyltrimethylammonium chloride-chitooligosaccharide aqueous solution accounting for a mass percentage of 2.5% of the attapulgite. After spraying, the resultant was continuously stirred for 30 min, and then put into an extruder for extrusion. The extrudate was dried, crushed and packaged to obtain a product.

EXAMPLE 5

Under stirring, a mixture of carvacrol accounting for a mass percentage of 5% of the attapulgite, cinnamaldehyde accounting for a mass percentage of 10% of the attapulgite and tea tree oil accounting for a mass percentage of 5% of the attapulgite was sprayed onto the surface of attapulgite powders, and then placed in a ball mill for grinding for 30 min with a ball-to-material ratio of 1:10. The resulting mixture was placed in a stirring tank, sprayed with heating-melted glyceryl monolaurate accounting for a mass percentage of 8% of the attapulgite, and then sprayed with a benzyldodecyldimethylammonium bromide aqueous solution accounting for a mass percentage of 5% of the attapulgite. After spraying, the resultant was continuously stirred for 30 min, and then put into an extruder for extrusion. The extrudate was dried, crushed and packaged to obtain a product.

EXAMPLE 6

Under stirring, a mixture of oregano essential oil accounting for a mass percentage of 2.5% of the attapulgite, carvacrol accounting for a mass percentage of 5% of the attapulgite, cinnamaldehyde accounting for a mass percentage of 5% of the attapulgite, citral accounting for a mass percentage of 2.5% of the attapulgite, tea tree oil accounting for a mass percentage of 2.5% of the attapulgite and wormwood oil accounting for a mass percentage of 2.5% of the attapulgite was sprayed onto the surface of attapulgite powders, and then placed in a ball mill for grinding for 30 min with a ball-to-material ratio of 1:10. The resulting mixture was placed in a stirring tank, sprayed with heating-melted glyceryl monolaurate accounting for a mass percentage of 3% of the attapulgite, and then sprayed with an N-hydroxypropyltrimethylammonium chloride-chitooligosaccharide aqueous solution accounting for a mass percentage of 3% of the attapulgite. After spraying, the resultant was continuously stirred for 30 min, and then put into an extruder for extrusion. The extrudate was dried, crushed and packaged to obtain a product.

In the above examples, the attapulgite was a product with purity equal to or greater than 90%, which was obtained by acidification with sulfuric acid accounting for a mass percentage of 2-3% of the attapulgite to remove the sands.

What is claimed is:

1. A method for preparing a natural antibacterial agent by immobilizing a plant essential oil in attapulgite pore channels, comprising:
   spraying the plant essential oil on a surface of attapulgite powder under stirring, mechanically grinding, then spraying liquid glyceryl monolaurate and a quaternary ammonium salt aqueous solution in turn, followed by stirring to provide a sprayed and stirred mixture, and extruding the sprayed and stirred mixture with an extruder, drying, crushing and packaging.

2. The method according to claim 1, wherein the attapulgite powder is a product with purity equal to or greater than 90% obtained by acidifying an attapulgite with an amount of sulfuric acid to remove sands, and the amount of sulfuric acid is 2-3 mass percentage of the mass of attapulgite to be acidified.

3. The method according to claim 1, wherein the plant essential oil is one or a mixture of at least two selected from the group consisting of oregano essential oil, carvacrol, cinnamaldehyde, citral, tea tree oil, eucalyptus oil and wormwood oil; and an amount of the plant essential oil is 15-50% of a mass of the attapulgite powder.

4. The method according to claim 1, wherein the mechanical grinding is conducted by grinding for 30 min in a ball mill with a ball-to-material ratio of 1:10.

5. The method according to claim 1, wherein an amount of glyceryl monolaurate is 5-10% of a mass of the attapulgite powder.

6. The method according to claim 1, wherein the quaternary ammonium salt aqueous solution is any one selected from the group consisting of a cetyltrimethylammonium bromide-chitooligosaccharide aqueous solution, a carboxymethyl hydroxypropyltrimethylammonium chloride-chitooligosaccharide aqueous solution, an N-hydroxypropyltrimethylammonium chloride-chitooligosaccharide aqueous solution, a cetyltrimethylammonium bromide aqueous solution, and a benzyldodecyldimethylammonium bromide aqueous solution.

7. The method according to claim 6, wherein an amount of the quaternary ammonium salt aqueous solution is 1-5% of a mass of the attapulgite powder.

8. The method according to claim 1, wherein the extruding is performed by extruding the sprayed and stirred mixture into long strips in semi-dry state with the extruder, and a diameter of the long strips is in a range of 0.2-0.6 mm.

* * * * *